April 12, 1960     J. J. SHINDELAR     2,932,355
TRACTOR STEERING CONTROL
Filed Sept. 6, 1955
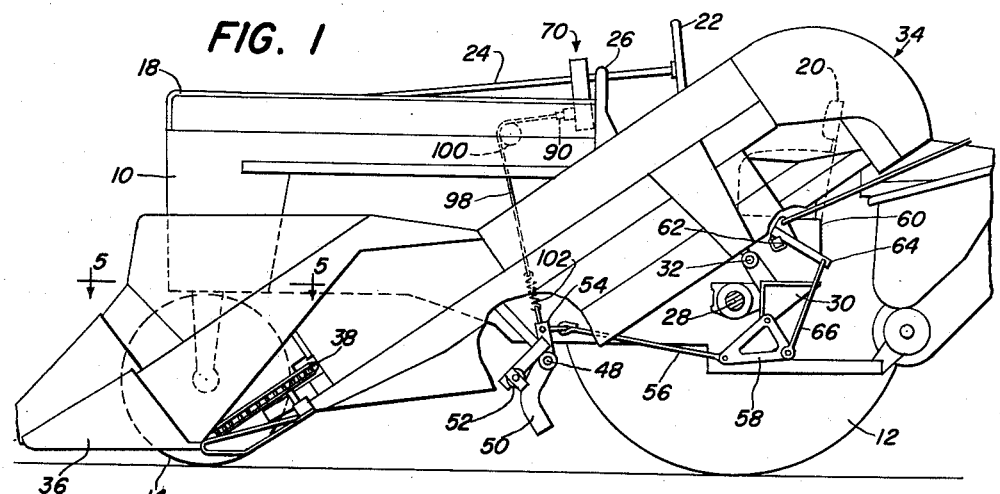
FIG. 1
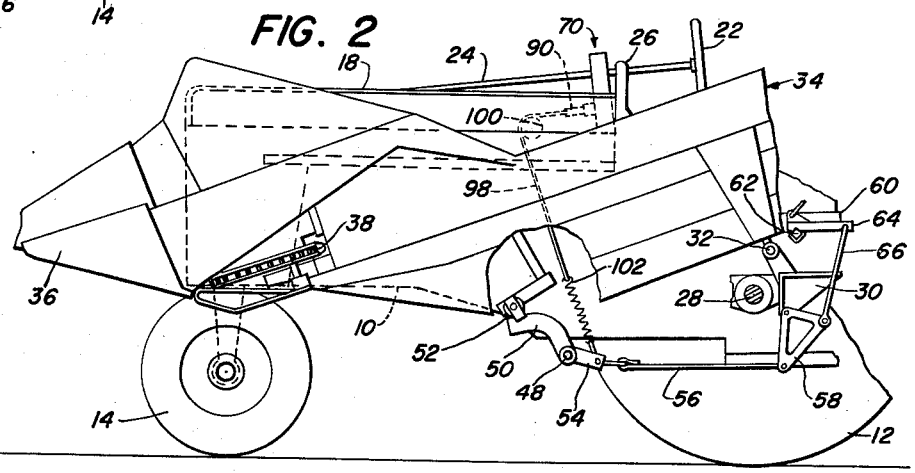
FIG. 2
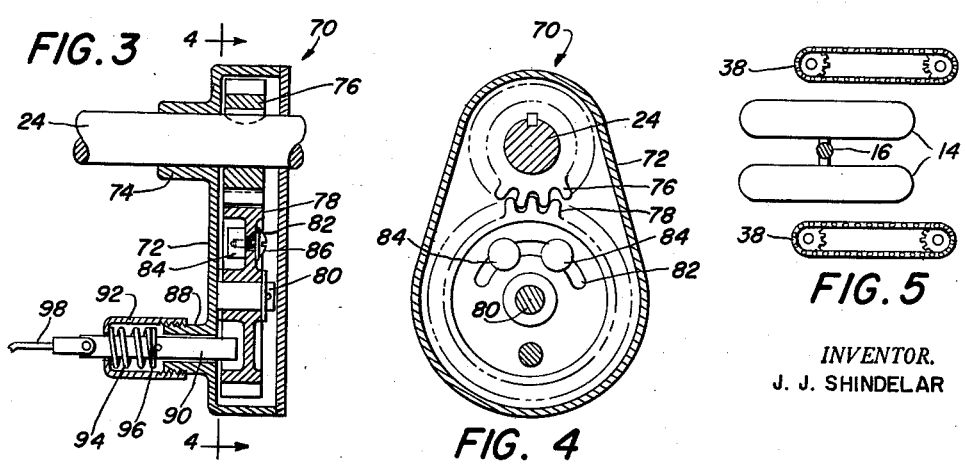
FIG. 3
FIG. 4
FIG. 5
INVENTOR.
J. J. SHINDELAR United States Patent Office 2,932,355
Patented Apr. 12, 1960

2,932,355

TRACTOR STEERING CONTROL

Joseph J. Shindelar, Ames, Iowa, assignor, by mesne assignments, to Deere & Company, a corporation of Delaware Application September 6, 1955, Serial No. 532,652

9 Claims. (Cl. 172—278)

This invention relates to vehicle steering and more particularly to means for selectively establishing a limit on the angular movement of a steering wheel for an agricultural tractor when used with certain types of implements.

A tractor-mounted harvester presents a typical example of the type of problem encountered and solved by the present invention. In a machine of that character, a harvesting part on the tractor lies in closely spaced relation to the front steerable wheels of the tractor and when the tractor is turned rather sharply, the front wheels engage parts of the harvester. This problem is not present when the harvester is raised to its transport position, as at the end of the field when the tractor is turned to start on another row. However, in the cases of contour harvesting and in other instances, the operator may inadvertently oversteer and cause damage to the tires or to the harvester, particularly in those cases in which the tractor is equipped with power steering and the operator does not have the same type of "feel" that he does with plain mechanical steering.

According to the present invention, an improved attachment is provided for the steering mechanism, preferably taking the form of a support attachable to the tractor adjacent to the steering wheel and including a pair of meshing gears, the first of which is keyed coaxially to the steering shaft and the second of which meshes with the first and has a pair of angularly spaced stops between which a retractable pin is located. When the pin is in its operating position, it is engageable with one or the other of the stops, depending upon the direction of steering, thereby serving as stop means for limiting angular movement of the steering shaft and therefore limiting turning of the steerable front wheels of the tractor. When the pin is retracted, the steering mechanism is normally operative. The invention features further means interconnecting the control means and the lift device on the tractor so that the locking pin is retracted when the harvester or similar implement is raised, thereby permitting full steering on turns at the end of the field.

The foregoing and other important objects and desirable features inherent in and encompassed by the invention will become apparent as a preferred embodiment of the invention is disclosed in detail in the following specification and accompanying sheet of drawings, the several figures of which will be described immediately below.

Fig. 1 is a side elevational view of a tractor-mounted corn picker, with portions broken away to show interior parts.

Fig. 2 is a similar view, but showing the corn picker in its raised position.

Fig. 3 is a longitudinal sectional view, on an enlarged scale, showing the interior of the control mechanism.

Fig. 4 is a transverse sectional view as seen along the line 4—4 of Fig. 3.

Fig. 5 is a fragmentary sectional view, largely schematic, as seen generally along the line 5—5 of Fig. 1.

The vehicle chosen for the purposes of illustration is a typical farm tractor having a longitudinal narrow body 10 supported on rear traction wheels, only one of which is shown at 12, the other being removed to expose the supporting and lift mechanism; and the forward end of the body is supported on a steerable wheeled truck 14, which in the present case comprises a pair of closely spaced apart wheels supported for steering about a vertical axis by an upright spindle 16 (Fig. 5). The forward portion of the body carries the usual radiator grille and hood structure, indicated in its entirety by the numeral 18. Behind this structure is a typical operator's station including a driver's seat 20 and ahead of this seat is a steering wheel 22 fixed to a forwardly extending steering shaft 24 that is in turn connected to suitable mechanism (not shown) for turning the spindle 16 to steer the front wheels 14. The rear part of the steering shaft 24 is appropriately journaled at 26 on a rear portion of the hood and grille structure 18.

The tractor has transverse rear axle structure 28 on which is mounted suitable bracket means 30 including a pivot 32 for mounting a harvester 34 for raising and lowering about the transverse axis of the pivot. The lowered or operating position of the harvester is shown in Fig. 1. The raised position apepars in Fig. 2. The harvester includes a forward gathering part 36 that has harvesting mechanism including gathering chains 38 that lie closely along opposite sides of the front wheeled truck 14, particularly when the harvester is in its operating position (Figs. 1 and 5). From this, it will be readily seen that if the wheels 14 are oversteered, the tires on the wheels will engage the gathering chains 38, causing damage to both components. As shown in Fig. 2, when the harvester is raised to its transport position, the chains 38 are high enough so that they will not be contacted by the tires on the wheels 14 when the wheels are steered.

Raising and lowering of the harvester between its operating and transport positions is accomplished by lifting means including a transverse lift shaft 48 to which is fixed a lifting arm 50. This arm is engageable with a roller 52 that is secured to an intermediate portion of the harvester 34. An arm 54 is secured to the lift shaft 48 and is connected by a rearwardly extending link 56 to a bell crank 58 on the bracket means 30. The tractor is conventionally equipped with a power lift device contained in a rear-mounted housing 60 and the mechanism (not shown) within this housing serves to power a transverse rockshaft 62 which is connected to the bell crank 58 by means of an arm 64 and link 66.

The mechanism for selectively controlling the amount of angular movement permitted to the steering shaft 24 is indicated in its entirety by the numeral 70. As best shown in Figs. 3 and 4, this means includes a support in the form of a housing 72 including a journaled portion 74 by means of which the unit 70 may be mounted on the steering shaft 24. Other portions of the unit may be suitably secured to the support 26 to prevent angular shifting thereof. The unit includes a first gear 76 keyed to the steering shaft 24 and in constant mesh with a second gear 78 journaled on a stub shaft 80 within a lower portion of the housing or support 72. The gear 78 accordingly reflects angular movement of the steering shaft 24 and it will be readily seen that if angular movement of the gear is controlled, angular movement of the steering shaft 24 will be controlled. For this purpose, the gear 78 has therein an arcuate slot 82 in which is carried a pair of stops 84. These stops are preferably set up in angularly spaced relationship as shown in Fig. 4, although their positions relative to each other and relative to the gear may be adjusted along the slot 82, because each stop is releasably secured in place by means including a cap screw 86.

The lower portion of the housing 72 carries a sleeve 88 in which is slidably mounted stop means including a retractable locking pin 90. A spring housing 92 secured to the sleeve 88 encloses a compression spring 94 which acts against a washer 96 on the pin 90 to normally urge the pin into position to be engaged by one or the other of the stops 84, depending upon the direction of rotation of the gear 78. The spring 94 is yieldable to permit the pin 90 to be retracted to a position in which it clears the stops 84, in which event the steering mechanism will have its normal range of operation. Inasmuch as the unit 70 is located in proximity to the operator's seat 20, manual retraction of the pin 90 may be accomplished. However, according to the present invention, the retraction of the pin is made automatic, in response to the operation of the lift device 60. For this purpose, the forward end of the pin 90 has connected thereto a cable or similar flexible element 98 and this cable is trained around a tractor-carried sheave 100, to have its other end connected at 102 to the lift arm 54 on the lift shaft 48. A spring is used in the connection 102 to permit overtravel of the lift arm 54.

From the foregoing description, it will be seen that when the harvester 34 is in its operating position, the locking pin 90 is in its first position so that it will be engaged by one or the other of the stops 84, whereby to limit angular movement of the gear 78 to less than its normal range. This will prevent oversteering of the front wheels 14 during normal operating conditions. When the tractor reaches the end of the row, the operator normally causes the lift device 60 to raise the harvester to the position of Fig. 2. As the lift mechanism operates, it automatically, via the cable 98, retracts the pin 90 so that a sharp turn can be made, since the pin 90, when retracted, clears the stops 84 and in that condition permits normal angular movement of the gear 78 by the steering shaft 24.

Features of the invention not categorically enumerated herein will undoubtedly occur to those versed in the art, as will many modifications and alterations in the preferred embodiment of the invention disclosed, all of which may be achieved without departure from the spirit and scope of the invention.

What is claimed is:

1. In a tractor having a lift device and steering mechanism including a steering shaft rotatable through a normal range of steering, the improvement comprising: a first gear fixed to the shaft; a support carried by the tractor; a second gear journaled on the support and meshing with the first gear for rotation through a normal range by the steering shaft; a pair of angularly spaced stops carried by the second gear; a lock member carried by the support for movement between a first position centrally between the stops, to limit angular movement of the second gear less than its normal range, and a second position clear of said stop so as to enable normal rotation of said second gear; and means interconnecting the lock member and the lift device to selectively incur the positions of said member by actuation of said device.

2. The invention defined in claim 1, in which: each stop is angularly adjustable to vary its relationship to the lock member.

3. The invention defined in claim 2, in which: the adjustability of each stop is achieved by means including an arcuate slot in the second gear and each stop has releasable securing means selectively engageable with and disengageable from said second gear and including a portion passing through the respective slot.

4. In a tractor having a lift device and steering mechanism including a steering shaft rotatable through a normal range of steering, the improvement comprising: a gear connected to the steering shaft for rotation through a normal range by the steering shaft; a pair of angularly spaced stops carried by the gear; a lock member carried by the tractor for movement between a first position centrally between the stops, to limit angular movement of the gear less than its normal range, and a second position clear of said stops so as to enable normal rotation of said gear; and means interconnecting the lock member and the lift device to selectively incur the positions of said member by actuation of said device.

5. The invention defined in claim 4, in which: each stop is angularly adjustable to vary its relationship to the lock member.

6. The invention defined in claim 5, in which: the adjustability of each stop is achieved by means including an arcuate slot in the gear and each stop has releasable securing means selectively engageable with and disengageable from said gear and including a portion passing through the respective slot.

7. In a tractor having a lift device and steering mechanism including a steering shaft rotatable through a normal range of steering, the improvement comprising: a member connected to the steering shaft for angular movement by said shaft through a normal range; bi-positionable stop means on the tractor having a first position of engageability with the member to limit angular movement thereof to less than its normal range and a second position clear of said member to permit said normal range; and means interconnecting the stop means and the lift device for selectively incurring the positions of the former by actuation of the latter.

8. In a tractor having steering mechanism including a steering wheel, the improvement comprising: a first gear connected coaxially with and adjacent to the steering wheel; a support on the tractor adjacent to the steering wheel; a second gear journaled on the support in mesh with the first gear for rotation in a normal range by the steering wheel via said first gear; and stop means movable on the support selectively into and out of engagement with the second gear to reduce the range of rotation thereof to a degree less than the normal range.

9. The invention defined in claim 8, including: a pair of angularly spaced stops on the second gear; and the stop means comprises a shiftable lock member having one position of projection between the stops to limit angular movement of the second gear in either direction and a second position clear of the stops to enable normal range rotation of said second gear.

References Cited in the file of this patent

UNITED STATES PATENTS

| | | |
|---|---|---|
| Re. 23,083 | Andrews et al. | Feb. 8, 1949 |
| 1,057,127 | Dodge | Mar. 25, 1913 |
| 1,158,566 | Schmidt | Nov. 2, 1915 |
| 1,432,237 | Dutton | Oct. 17, 1922 |
| 1,711,037 | Bojer | Apr. 30, 1929 |
| 1,973,048 | Brown | Sept. 11, 1934 |
| 2,680,015 | Andrews et al. | June 1, 1954 |